United States Patent [19]
Lee

[11] Patent Number: 5,691,970
[45] Date of Patent: Nov. 25, 1997

[54] OPTICAL PICKUP FOR HIGH-DENSITY RECORDING/REPRODUCING

[75] Inventor: Yong-Jae Lee, Uiwang, Rep. of Korea

[73] Assignee: Samsung Electronics, Co., Ltd., Kyungki-Do, Rep. of Korea

[21] Appl. No.: 648,911

[22] Filed: May 16, 1996

[30] Foreign Application Priority Data

Aug. 18, 1995 [KR] Rep. of Korea ............... 95-25457

[51] Int. Cl.$^6$ ....................... G11B 7/12
[52] U.S. Cl. ............ 369/109; 369/112; 369/44.11
[58] Field of Search ............... 369/109, 112, 369/111, 110, 100, 118, 44.11, 44.12, 44.14, 44.37

[56] References Cited

U.S. PATENT DOCUMENTS

5,579,298  11/1996  Opheij et al. ............... 369/112

FOREIGN PATENT DOCUMENTS

190698   8/1986  European Pat. Off. .
4-47528  2/1992  Japan .

OTHER PUBLICATIONS

Patent Abstracts Of Japan, vol. 16, No. 225 (P-1360), May 26, 1992.
Patent Abstracts of Japan, vol. 017, No. 329 (P-1561), Jun. 22, 1993 & JP 05 036103.
Patent Abstracts of Japan, vol. 016, No. 580 (P-1461), Dec. 18, 1992 & JP 04 228124.
Patent Abstracts of Japan, vol. 016, No. 547 (P-1452) Nov. 17, 1992 & JP 04 205731.
Patent Abstracts of Japan, vol. 014, No. 352 (P-1085), Jul. 30, 1990 & JP 02 126429.

*Primary Examiner*—Muhammad N. Edun
*Attorney, Agent, or Firm*—Sughrue, Mion, Zinn, Macpeak & Seas, PLLC

[57] ABSTRACT

An optical pickup for high-density recording/reproducing, which can read the information recorded at a close interval to exceed the limit of a given cut-off frequency, includes an objective lens having divided portions for respectively transmitting a zero-order optical component and ±1st-order diffracted components. To detect a signal for reproduction, a focusing lens is used for focusing the zero-order component and ±1st-order diffracted components passing back through the objective lens so as to mutually interfere. Stable high-density optical recording/reproduction can be realized regardless of the numerical aperture of the objective lens and the optical wavelength.

14 Claims, 5 Drawing Sheets

OPTICAL PICKUP FOR HIGH-DENSITY RECORDING/REPRODUCING

BACKGROUND OF THE INVENTION

The present invention relates to an optical pickup for high-density recording/reproducing and, more particularly, to an optical pickup for the high-density recording/reproducing which can close an information recording interval along a track on a light-recording medium.

To increase the recording density of an optical recording medium, the size of a beam spot formed on the medium should be reduced as much as possible, which is generally accomplished through an objective lens of an optical pickup. Even assuming a lens with absolutely no aberration is used as the objective lens, there is a limit as to how small the spot can become. The diameter of the beam spot is directly proportional to the optical wavelength, but is inversely proportional to the numerical aperture of a lens. Thus, high-density recording and reproducing is generally realized by reducing the spot size formed on the light-recording medium, using a light source of a short wavelength (e.g., using a second harmonic generator) and an objective lens having a large numerical aperture.

However, short-wavelength light sources are expensive, and even if an objective lens with a large numerical aperture is used, the spot stability decreases according to the tilt of the recording medium (e.g., an optical disk). Accordingly, different methods are required to achieve high stability at relatively low cost.

FIG. 1 illustrates a conventional optical pickup to explain the principle of the recording and reproduction by the optical pickup. In FIG. 1, a reference numeral 1 denotes a light source; a reference numeral 2 denotes a collimating lens for collimating a light beam generated from the light source 1; a reference numeral 3 denotes a beam splitter for separating light beams incident to an optical disk and light beams reflected therefrom; a reference numeral 4 denotes an objective lens for focusing an incident light beam on the optical disk within a diffraction limit, after having passed through the beam splitter 3; a reference numeral 5 denotes an optical signal detector for detecting signals by receiving the reflected light beams; and a reference numeral 6 denotes an optical disk. That is, the light beam generated from the light source 1 is incident upon the objective lens 4 via the collimating lens 2 and the beam splitter 3 and thus focused on the recording surface of the optical disk 6, to be reflected and thus travel back to the optical signal detecting device 5 via the objective lens 4 and the beam splitter 3 for detection. The reflected beams are detected as a reproduced information signal and a servo tracking signal for controlling the objective lens 4.

As shown in FIG. 2, recording marks 7 (e.g., pits) for recording an information unit are spaced along tracks of the optical disk 6 with a predetermined pitch p. A beam spot 8 of the incident light is focused via the objective lens 4 and moves (in the direction of the arrow) according to the rotation of the optical disk 6 along the line (track) of the recording marks 7. Though, theoretically, the recording density will increase with a narrower pitch or track spacing of the recording marks 7, there are practical limits in doing so conventionally, which will be described substantially as follows.

Referring to FIG. 3, the light beams focused on the optical disk are reflected and diffracted from the boundary of the recording marks 7 on the recording surface of the optical disk 6, to produce a zero-order light component 9 and ±1st-order diffracted light components 10 and 11. The diffracted light components 10 and 11 partially overlap the zero-order light component 9, causing mutual interference. In this case, the zero-order light beam is reincident upon the objective lens with the same diameter as that of the objective lens. An alteration of the light amount occurs on the portions whereon the zero-order light component 9 and ±1st-order diffracted light components 10 and 11 interfere with each other due to a relative phase difference therebetween. This change of the light amount makes the signal for reproduction detected by the optical signal detecting device 5. In other words, the information recorded on the optical disk can be reproduced from the change of the light amount (i.e., if such diffraction and interference do not happen, the reproduction signal cannot be acquired), which can be briefly expressed in the following formula:

$$h = a\left(\frac{\lambda}{p \times NA}\right)$$

where $\lambda$ is the light wavelength, NA is the numerical aperture of an objective lens, a is half of the diameter of the objective lens, p is the pitch of the recording marks 7 (FIG. 2), and h is the distance between the optical axes of the zero-order light component 9 and the ±1st-order diffracted light components 10 and 11 (FIG. 3). For reference, 1/p designates a cut-off frequency.

Thus, if the pitch p drops below $\lambda/2NA$ (i.e., $h \geq 2a$), interference between the zero-order light and ±1st-order diffracted light components does not occur. Under the conventional environment of the optical pickup, the data on the optical disk, when recorded at a close interval to exceed the limit of a given cut-off frequency, cannot be read. In other words, there is a limit to increasing the recording density of an optical recording medium.

SUMMARY OF THE INVENTION

It is an object of the present invention to provide an optical pickup for high-density recording/reproducing to increase the recording density regardless of the optical wavelength or the numerical aperture of an objective lens and to provide for optical stability.

To accomplish the above object, there is provided an optical pickup for high-density recording/reproducing, comprising: a light source for generating a light beam; an objective lens for focusing the light beam on a light-recording medium; and an optical signal detecting means for detecting a signal by receiving reflective light beams diffracted and reflected by the light-recording medium, wherein the objective lens includes a first portion for transmitting a zero-order optical component of the reflective light beams and second and third portions for respectively transmitting at least a portion of each +1st-order diffracted optical components of the reflective light beams.

Thus, the present invention can use an objective lens which is coated opaquely except for the first, second and third portions thereof.

Also, it is preferable that the present invention further comprises means for controlling the diameter of a light beam generated by the light source so that the light beam is incident to the first portion of the objective lens, means for making the zero-order optical component and the ±1st-order diffracted optical components of the reflective light beams which have passed back through the objective lens mutually interfere, and means for selecting the zero-order optical component, among the reflective light beams which have passed back through the objective lens.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE PREFERRED EMBODIMENTS

Figure 1:
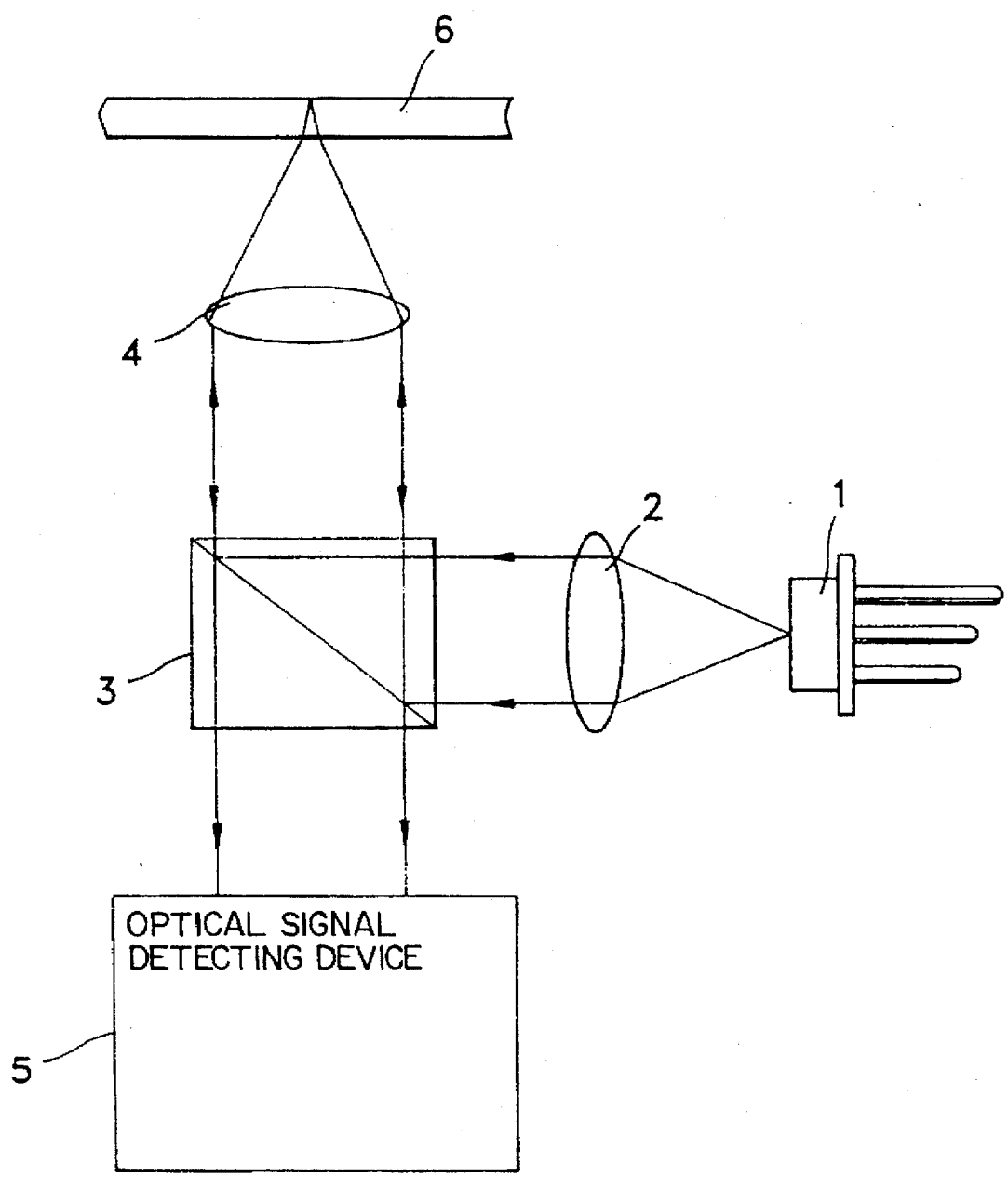
FIG. 1 shows a conventional optical pickup.
Figure 2:
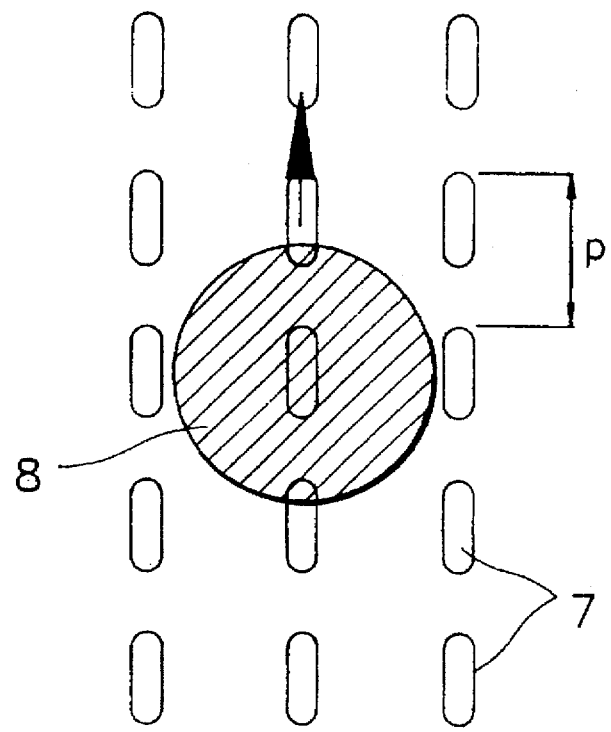
FIG. 2 shows recording marks of an optical disk and a beam spot following the recording marks.
Figure 3:
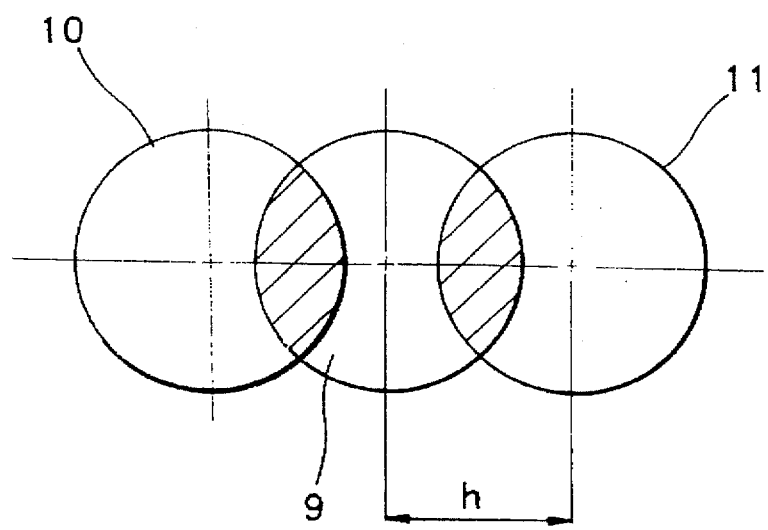
FIG. 3 shows beam spots diffracted and reflected from the optical disk.
Figure 4:
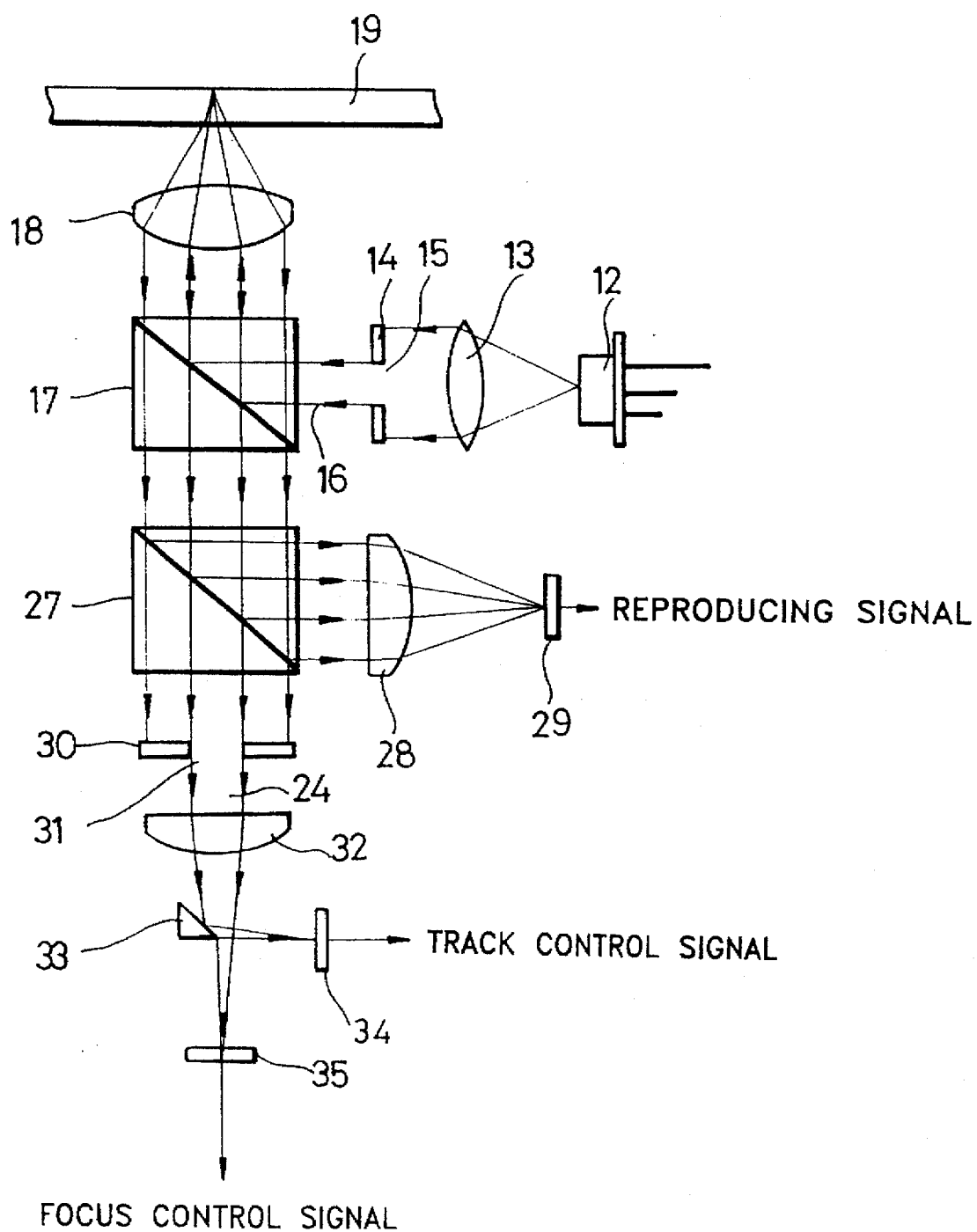
FIG. 4 shows a pickup for high-density recording/reproducing according to the present invention.

In FIG. 4, for example, a laser diode is used as a light source 12 for emitting a laser light beam. A collimating lens 13 collimates the light beams emitted from the laser diode 12. A first slit member 14 in front of the collimating lens 13 has an aperture 15 of a predetermined diameter for restricting the light beam from the collimating lens 13. Light beam 16 passing through the aperture 15 of the first slit member 14 is reflected by a first beam splitter 17 toward an objective lens 18. Alternatively, in lieu of the first slit member 14, a transparent medium material which is completely coated opaquely, except for the portion corresponding to the aperture 15, can be used, or a collimating lens (similarly coated) may be used as the first slit member 14.

Figure 5:
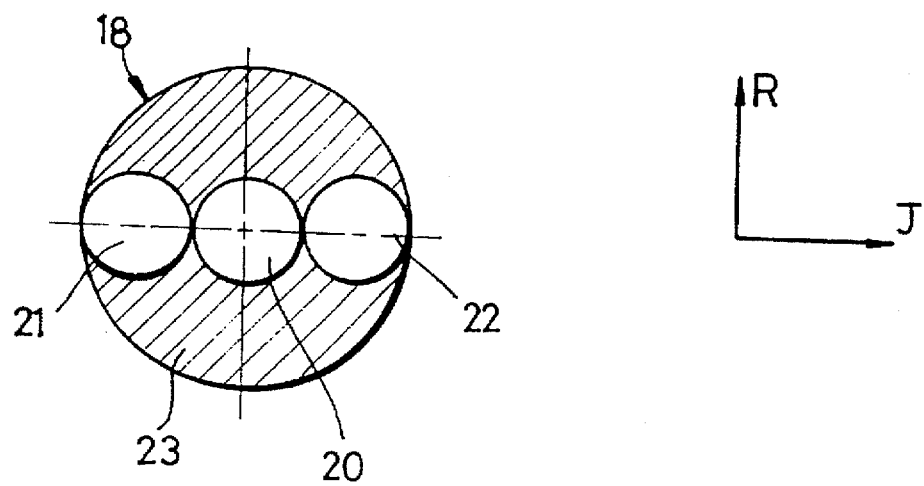
FIG. 5 is a plan view showing an incident surface of an objective lens used in the optical pickup for high-density recording/reproducing according to the present invention.

Referring to FIG. 5, the objective lens 18 is composed of a first portion 20 formed on the center of its light-receiving (or light-emitting) surface, second and third portions 21 and 22, respectively, formed in contact with the outer sides of the first portion 20, and a hatched portion 23. The portions 20, 21 and 22 are aligned in the direction J perpendicular to a radial direction R of the optical disk, i.e., in the jitter direction.

Figure 6:
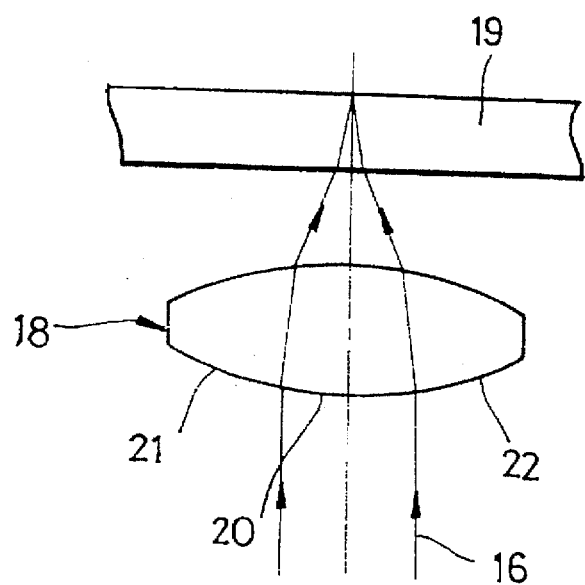
FIG. 6 is a schematic profile showing the paths of the incident light beams via the optical pickup for high-density recording/reproducing according to the present invention.

Referring to FIG. 6, the first portion 20 of the objective lens 18 receives the light beam 16 whose diameter is substantially adjusted to that of the first portion 20 by the aperture of the first slit member 14 as described above. The light beam 16 is focused up to its maximum diffractive limitation through objective lens 18, to be formed in a spot on the surface of the optical disk 19. The spot on the optical disk 19 follows the recording marks by the rotation of the optical disk 19 by a spindle motor (not shown), to thereby be diffracted and reflected on the boundary of the recording marks.

Figure 7:
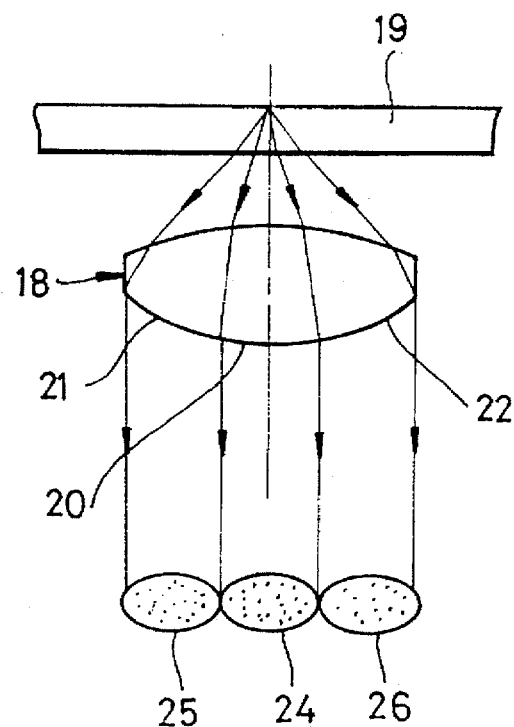
FIG. 7 is a schematic profile showing the paths of the reflected light beams via the optical pickup for high-density recording/reproducing according to the present invention.

Referring to FIG. 7, a zero-order optical component 24 among the reflected light beams by the optical disk 19 passes through the first portion 20 of the objective lens 18 by the same course as the incident light beam. Among the reflected light beams, the ±1st-order diffracted optical components 25 and 26 diffracted in the jitter direction pass through the second and third portions 21 and 22 of the objective lens 18, respectively, to thereby continue on in parallel with the zero-order optical component 24.

Referring back to FIG. 4, the reflected light beams comprising the zero-order optical component 24 and ±1st-order diffracted optical components 25 and 26 go straight through the first beam splitter 17, with some of the light being reflected by the second beam splitter 27, and the remainder continuing on forward straight through the second beam splitter 27.

A first focusing lens 28 focuses the zero-order optical component 24 and the ±1st-order diffracted optical components 25 and 26 reflected by the second splitter 27 on a first optical detector 29 in a spot, whereby the different components of the reflected light beams mutually interfere. Accordingly, the first optical detector 29 detects signals for reproduction according to the change of the light amounts due to the mutual interference between the zero-order optical component 24 and the ±1st-order diffracted optical components 25 and 26 from the spot of received light beams thereon.

Meanwhile, the zero-order optical component 24 of the reflected light beams travelling straight through the second beam splitter 27 passes through an aperture 31 of a second slit member 30, but the ±1st-order diffracted optical components 25 and 26 are intercepted by the second slit member 30. The zero-order optical component 24 passing through the aperture 31 of the second slit member 30 is focused by a second focusing lens 32, some of which is reflected by an edge prism 33 and the remainder passes without obstruction. Some of the zero-order optical component 24 reflected by the edge prism 33 is received by a second optical detector 34, to be detected as a signal for indicating a track location of the objective lens 18. The remainder of the zero-order optical component 24 passing through the edge prism 33 is received by a third optical detector 35, to be detected as a signal for indicating a focus location of the objective lens 18.

According to such an embodiment, the distance between the optical axes, in the jitter direction, of the zero-order optical and ±1st-order diffracted optical components of the reflected light beams is greater than or equal to the diameter of the first portion on the objective lens used in the present invention (h≧2a). In other words, since the signal for the reproduction can be detected even though the pitch of the recording marks on the optical disk is less than or equal to λ/2NA, reproduction at high density (above the cut-off frequency) is possible. In addition, high-density recording can be realized by reducing the interval of the recording marks on the optical disk regardless of the numerical aperture of the objective lens or the optical wavelength.

Figure 8:
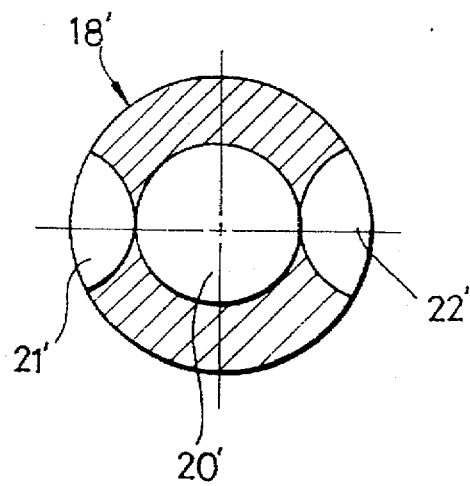
FIG. 8 is a plan view showing another embodiment with respect to the objective lens used in the optical pickup for high-density recording/reproducing according to the present invention.

Next, FIG. 8 shows another embodiment of an objective lens in the present invention. An objective lens 18' includes a first portion 20' formed for receiving the zero-order optical component adjacent to an optical axis and second and third portions 21' and 22' formed on both sides thereof, for partially receiving the ±1st-order diffracted optical components. Compared with the case of forming the aperture portion of an objective lens in a perfect circle in order to completely receive the ±1st-order diffracted optical components as in the prior embodiment, the embodiment in FIG. 8 has an advantage in that the diameter of the objective lens 18' can be made smaller.

In addition, in the present invention, instead of dividing the objective lens into the portions for receiving the components of the reflected light beams respectively as in the above embodiments, a lens having a much larger diameter than the conventional objective lens can be provided for the receiving operation.

As described above, in the present invention, the recording and reproduction of data at high density (above the cut-off frequency) can be realized, without deteriorating the optical stability and regardless of the optical wavelength or the numerical aperture of the objective lens. Also, the present invention enables the application to an optical pickup for recording/reproduction at super-high density, through the simultaneous use of an objective lens having a large numerical aperture and a short-wavelength light source.

It is contemplated that numerous modifications may be made to the optical pickup of the present invention without departing from the spirit and scope of the invention as defined in the following claims.

What is claimed is:

1. An optical pickup for high-density recording/reproducing, comprising:
    a light source for generating a light beam;
    an objective lens for focusing the light beam on a light-recording medium; and
    means for detecting an optical signal by receiving reflective light beams diffracted and reflected by the light-recording medium,
    wherein said objective lens includes a first portion for transmitting a zero-order optical component of the reflective light beams and second and third portions for respectively transmitting at least a portion of each ±1st-order diffracted optical components of the reflective light beams.

2. The optical pickup for high-density recording/reproducing as claimed in claim 1, wherein said objective lens is coated opaquely except for the first, second and third portions thereof.

3. The optical pickup for high-density recording/reproducing as claimed in claim 1, further comprising means for controlling the diameter of the light beam generated by said light source so that the light beam is incident to the first portion of said objective lens.

4. The optical pickup for high-density recording/reproducing as claimed in claim 3, wherein said means for controlling the diameter comprises:
    a slit member having an aperture passing therethrough with a predetermined diameter, said slit member being installed between said light source and said objective lens in order to restrictively transmit the light beam from said light source to the first portion of said objective lens through the aperture.

5. The optical pickup for high-density recording/reproducing as claimed in claim 4, wherein the aperture of said slit member is substantially the same size as the first portion of said objective lens.

6. The optical pickup for high-density recording/reproducing as claimed in claim 4, further comprising a collimating lens, installed between said light source and slit, for collimating the light beam generated from said light source.

7. The optical pickup for high-density recording/reproducing as claimed in claim 1, further comprising means for making the zero-order optical component and ±1st-order diffracted optical components of the reflective light beams which have passed through said objective lens mutually interfere.

8. The optical pickup for high-density recording/reproducing as claimed in claim 1, further comprising means for transmitting the zero-order optical component, and blocking the other reflective light beams which have passed through said objective lens.

9. The optical pickup for high-density recording/reproducing as claimed in claim 1, wherein said optical signal detecting means comprises:
    a focusing lens for focusing the zero-order optical component and ±1st-order diffracted optical components of the reflective light beams transmitted respectively by the first, second and third portions of said objective lens, to make the focused zero-order optical component and ±1st-order diffracted optical components of the reflective light beams mutually interfere with each other; and
    an optical detector for detecting a signal for reproducing information recorded on said light-recording medium according to a change of light amount due to the mutual interference between the zero-order optical and ±1st-order diffracted optical components of the reflective light beams focused by said focusing lens.

10. The optical pickup for high-density recording/reproducing as claimed in claim 1, wherein said means for detecting an optical signal includes means for detecting signals for informing a track location and a focus location of said objective lens from the zero-order optical component of the reflective light beams transmitted by the first portion of said objective lens.

11. The optical pickup for high-density recording/reproducing as claimed in claim 10, wherein said optical signal detecting means comprises:
    a slit member having an aperture for passing the zero-order optical component of the reflective light beams coming via said objective lens and for blocking the ±1st-order diffracted optical components;
    a focusing lens for focusing the zero-order optical component of the reflective light beams passing through the aperture of said slit member;
    an edge prism for reflecting a portion of the zero-order optical component of the reflective light beams focused by said focusing lens, and passing the remainder thereof, centered on an optical axis;
    an optical detector for detecting a signal for informing the track location of said objective lens from the zero-order optical component of the reflective light beams reflected by said edge prism; and
    another optical detector for detecting a signal for informing the focus location of said objective lens from the zero-order optical component of the reflective light beams passing through said edge prism.

12. An optical pickup for high-density recording/reproducing, comprising:
    a light source for generating a light beam;
    a collimating lens for collimating the generated light beam to form a collimated light beam;
    a first slit member with an aperture for passing the collimated light beam therethrough, thereby to restrict the diameter of the collimated light beam to a predetermined diameter;
    an objective lens, for focusing the collimated light beam which has passed through the aperture of said first slit member, which comprises a first portion for transmitting a zero-order light of reflective beams which are generated by being diffracted and reflected by a light-recording medium in parallel, and second and third portions for respectively transmitting at least a portion of each ±1st-order diffracted light components which are diffracted in a jitter direction of the reflective light beams, wherein said first, second and third portions do not overlap;

a first beam splitter for reflecting the collimated light beams which have passed through the aperture of said first slit member toward said objective lens, and also for transmitting straight through the reflective light beams which have passed through said objective lens;

a second beam splitter for reflecting a portion of the reflective light beams while transmitting straight through a remainder thereof, in order to divide a light amount of the reflective light beams transmitted straight through said first beam splitter;

a first focusing lens for focusing the zero-order optical component and ±1st-order diffracted optical components of the portion of the reflective light beams reflected by said second beam splitter so as to mutually interfere;

a first optical detector for receiving the zero-order optical component and ±1st-order diffracted optical components of the reflective light beams focused by said first focusing lens and for detecting a signal for reproduction of information recorded on said light-recording medium;

a second slit member having an aperture for passing the remainder of the zero-order optical component of the reflective light beams transmitted straight through said second beam spitter and intercepting the remainder of the ±1st-order diffracted optical components thereof;

a second focusing lens for focusing the zero-order optical component of the reflective light beams which have passed through the aperture of said second slit member;

an edge prism for reflecting a portion of the zero-order optical component of the reflective light beams focused by said second focusing lens, and passing a remainder thereof;

a second optical detector for receiving the zero-order optical component of the reflective beams reflected by said edge prism and for detecting a signal for informing a track location of said objective lens; and a third optical detector for receiving the zero-order optical component of the reflective light beams which have passed through said edge prism and for detecting a signal for informing a focus location of said objective lens.

13. The optical pickup for high-density recording/reproducing as claimed in claim 12, wherein said objective lens is coated opaquely except for the first, second and third portions thereof.

14. An optical pickup for high-density recording/reproducing, comprising:

a light source for generating a light beam;

an objective lens for focusing the light beam on a light-recording medium; and an optical detecting mechanism including a plurality of focusing lenses which focus optical components of reflected light beams, and a plurality of optical detectors which detect optical signals by receiving optical components of reflected light beams diffracted and reflected by the light-recording medium, wherein said objective lens includes a first portion for transmitting a zero-order optical component of the reflective light beams and second and third portions for respectively transmitting at least a portion of each ±1st-order diffracted optical components of the reflective light beams.

* * * * *